UNITED STATES PATENT OFFICE.

ISAAC NEWTON PEIRCE, OF BOSTON, MASSACHUSETTS.

IMPROVED COMPOSITION FOR CRAYONS.

Specification forming part of Letters Patent No. 45,518, dated December 20, 1864.

*To all whom it may concern:*

Be it known that I, ISAAC NEWTON PEIRCE, late of Darby, Delaware county, Pennsylvania, now of Boston, in the State of Massachusetts, have invented or discovered a new and Improved Base for the Manufacture of Crayons for the Purpose of Marking Therewith; and I do hereby declare that the following is a full and clear description of the base and its compounds, necessarily varied by the proportions of the ingredients for the various uses to which the crayons shall be put.

The nature of my invention consists in the use or application of the prepared or purified kaolin as a base, instead of talc or chalk, in the manufacture of crayons.

The unctuous nature of the kaolin gives to the manufactured crayons several qualities, such as giving out much less dust while marking on cloth by tailors or on the blackboard in schools, and in being consequently more durable. Hence this new base is a desired improvement over that of chalk, which is of a more dry and granular texture, however well washed, and objectionable on account of the dust caused by their use.

For ordinary school purposes, to be used on the blackboard, I use the following composition, viz:

|  | Parts. |
|---|---|
| Kaolin | 48 |
| Calcined plaster-of-paris (gypsum) | 16 |
| Water | 35 |
| White glue | 1 |
|  | 100 |

I claim, however, modifying the several proportions of the ingredients named, for special purposes, for constituting a harder or softer crayon. The above formula, however, by trial proves to make crayons of superior quality for all purposes for which crayons are chiefly used.

What I claim as my invention is—

The combination of kaolin with the several ingredients specified, substantially in the proportions and for the purpose set forth.

I. NEWTON PEIRCE.

Witnesses:
 CHAS. R. FRAILEY,
 JACOB STAUFFER.